(12) United States Patent
Doles et al.

(10) Patent No.: US 7,588,633 B2
(45) Date of Patent: Sep. 15, 2009

(54) FILLER COMPONENT FOR INVESTMENT CASTING SLURRIES

(75) Inventors: Ronald S. Doles, LaGrange Park, IL (US); David S. Viers, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/931,330

(22) Filed: Oct. 31, 2007

(65) Prior Publication Data

US 2008/0047682 A1 Feb. 28, 2008

Related U.S. Application Data

(63) Continuation of application No. 10/942,451, filed on Sep. 16, 2004, now abandoned.

(51) Int. Cl.
*C04B 28/26* (2006.01)
(52) U.S. Cl. .................. 106/600; 106/737; 264/113; 164/131
(58) Field of Classification Search ................. 106/39.9, 106/600, 737; 264/113; 164/131
See application file for complete search history.

(56) References Cited

U.S. PATENT DOCUMENTS

| 3,894,572 | A | 7/1975 | Moore, Jr. |
| 4,226,277 | A | 10/1980 | Matalon |
| 4,432,798 | A | 2/1984 | Helferich et al. |
| 4,529,028 | A * | 7/1985 | Dybala et al. |
| 4,530,722 | A | 7/1985 | Moore et al. |
| 4,569,920 | A * | 2/1986 | Smith-Johannsen |
| 4,996,084 | A * | 2/1991 | Elkachouty |
| 5,022,920 | A | 6/1991 | Buntrock et al. |
| 6,450,243 | B1 * | 9/2002 | Shaw et al. |
| 6,540,013 | B1 | 4/2003 | Doles |
| 6,755,237 | B2 * | 6/2004 | Duffey et al. |
| 6,769,475 | B2 * | 8/2004 | Shaw et al. .................. 164/518 |
| 6,770,699 | B2 | 8/2004 | Doles |

* cited by examiner

*Primary Examiner*—Paul Marcantoni
(74) *Attorney, Agent, or Firm*—William J. Maheras; Peter A. DiMattia; Michael B. Martin

(57) ABSTRACT

A filler component for making an investment casting slurry, which comprises: a major portion of finely divided silica, aluminum silicate, alumina, zircon, or mixtures thereof; and a minor portion of one or more finely divided materials having particles in which, on average, at least one dimension of the particle is at least about four times greater than at least one other dimension of the particle. Typically, the particles are of generally plate-like or needle-like shape.

10 Claims, No Drawings

FILLER COMPONENT FOR INVESTMENT CASTING SLURRIES

CROSS REFERENCE TO RELATED APPLICATIONS

This application is a continuation application of U.S. patent application Ser. No. 10/942,451, which was filed on Sep. 16, 2004 now abandoned.

FIELD OF THE INVENTION

This invention relates generally to investment casting, and, more particularly, to a filler component of investment casting slurry for making investment casting molds, which can have significantly improved characteristics

BACKGROUND OF THE INVENTION

As described in Doles U.S. Pat. No. 6,540,013 B1, and Doles et al. U.S. Pat. No. 6,770,699 B2, investment casting is used to produce high quality metal articles that meet relatively close dimensional tolerances. The process has also been called lost wax, lost pattern and precision casting. Typically, an investment casting is made by first constructing a thin-walled ceramic mold, known as an investment casting shell, into which molten metal can be introduced.

Shells are usually constructed by first making a facsimile or pattern, from a meltable substrate, of a metal object to be made by investment casting. Suitable meltable substrates may include, for example, wax, polystyrene, or other plastics.

Next, a ceramic shell is formed around the pattern. This may be accomplished by dipping the pattern into a slurry containing a mixture of liquid refractory binders such as colloidal silica, ethyl silicate, and/or various organic polymers, plus a refractory powder such as quartz, fused silica, zircon, alumina, or aluminosilicate (aluminum silicate), and then sieving dry, refractory grains onto the freshly dipped pattern (this step is usually referred to as stuccoing the mold). Typically, each coat of slurry and refractory grains is air-dried before subsequent coats are applied.

The shells are built up to a thickness in the range of about ⅛ to about ½ inch (i.e. about 0.3 cm. to about 1.3 cm). After final dipping and sieving (stuccoing), the shell is thoroughly air-dried. The shells made by this procedure have been called "stuccoed" shells, because of the texture of the shell's surface. The shell is then heated to at least the melting point of the meltable substrate. In this step, the substrate comprising the pattern is melted away, leaving only the shell and any residual, meltable substrate. The shell is then heated to a temperature high enough to vaporize or otherwise remove any residual, meltable substrate from the shell. Usually, before the shell is cooled from this high temperature heating, the shell is filled with molten metal in a conventional manner, such as a gravity, pressure, vacuum or centrifugal method. When the molten metal in the shell, called a casting mold, has solidified and cooled sufficiently, the shell is broken away to separate it from the casting.

As described in U.S. Pat. Nos. 6,450,243; 6,755,237; and 6,769,475 of Shaw and Duffey, slurries for the preparation of investment casting shells are disclosed, in which the slurries carry a small amount of short plastic fibers, which fibers improve the performance and characteristics of the material. However, such fiber-containing slurries also have certain technical difficulties: for example, the fibers are difficult to keep dispersed in the slurry. They also make the slurry viscosity more difficult to measure, and they can reduce accurate contact of the slurry to the pattern, so that they do not always reproduce small holes, slots, grooves, and other fine detail to the degree desired, although the material works well in many commercial uses.

In accordance with this invention, filler components for the preparation of investment casting slurries are disclosed in which various improvements are provided over the fiber containing slurries of the prior art. Specifically, improvements can be achieved in the uniformity of shell thickness, while providing rapid buildup of shell thickness and improved coverage of holes, corners, and details. Also, the drainage time of the slurry, compared with the fiber-containing slurries of the prior art, can be shortened.

DESCRIPTION OF THE INVENTION

In accordance with this invention, a filler component is provided for making an investment casting slurry, generally by mixture of the filler component with a generally conventional binder component which comprises binder materials in water. The filler component of this invention comprises: a major portion (1) which, in turn, comprises at least one finely divided material selected from the group consisting of silica, aluminum silicate, alumina, zircon, and mixtures thereof. A minor portion (2) is mixed with major portion (1). The minor portion comprises one or more finely divided materials having particles, which, on average, have one dimension which is at least about four times greater than at least one other dimension of the particle. That is to say: the particles may be plate-like or needle-like, for example.

The particles of the major portion (1), on average, exhibit a generally similar spatial extent in their three dimensions, like a cube or a sphere, typically having an average maximum particle dimension that is no more than about two or three times greater than the average minimum particle dimension. This is in contrast to the particles of the minor portion (2). Materials of major portion (1) may typically comprise conventional investment casting slurry ingredients, such as crushed, fused silica or calcined clay.

The above described minor portion of finely divided materials is present in a concentration which is sufficient to provide the advantages stated above, for example a concentration sufficient to reduce drainage time of a slurry containing the filler component after its application to an investment casting pattern, when compared with a similar slurry without the minor portion present. Typically, the minor portion may be present in the filler component in an amount of essentially 0.1 to 15 weight percent.

Typically, the filler component is essentially free of organic fibers, and exhibits advantages through the use of the typically plate-like or needle-like particles of the minor portion.

Materials used in the minor portion (2) may have, as stated, a plate-like particle shape: for example kaolin and other clays, mica (such as muscovite and biotite), talc, vermiculite, (including the expanded vermiculite) boehmite, titanium dioxide (such as rutile and anatase), gibbsite, diaspore, pyrophyllite, and laponite. Other clay minerals may be usable as well, for example illite, montmorillonite, or hectorite.

Alternatively, the minor portion (2) of finely divided materials may have a needle-like or tubular particle shape, which may be provided by minerals such as mullite, kyanite, wollastonite, halloysite (halloysite is a clay mineral with the needle-like particle shape of a rolled up tube), sillimanite, magnesium silicate, amphibole, asbestos and Acti-gel™, which is a self-dispersing magnesium aluminosilicate sold by Active Minerals Company LLC of Hunt Valley, Md. 21030. Carbon nanotubes are another usable micro-tubular structure.

The filler component of this invention may be used to form an investment casting slurry which comprises a mixture of the above filter component and a lesser amount of a binder component comprising binder materials dispersed in water. Typically, from 55% to 85% of the filler component is provided to the slurry, with substantially the balance comprising the generally conventional binder materials and water, plus other additives as may be appropriate. Typically, the solids of the slurry comprise 60% to 90%. The slurry viscosity may typically be about 8 to 30 seconds, measured by a Gardco/ISO Mini Dip Viscosity Cup with a 6 mm orifice, and preferably about 13 to 26 seconds. The viscosity can be adjusted with water, or added binder or filler material.

In some embodiments, the major portion (1) of the filler component may consist essentially of silica, typically fused silica, with the minor portion (2) being present in an amount of typically 0.1-15 weight percent.

In some embodiments, the minor portion (2) consists essentially of kaolin, in an amount of essentially 0.25-5 weight percent. The kaolin used can be a product of Feldspar Corporation, a subsidiary of Zemex Industrial Materials, Atlanta, Ga., having an average particle size of 1.02 micron.

Alternatively, the major portion (1) may consist essentially of aluminum silicate, or of a blend of fused silica and aluminum silicate.

Alternatively, the minor portion (2) of one or more finely divided materials of the filler component may consist essentially of clay minerals from the groups kaolinite, montmorillinite/smectite, illite, and chlorite. Examples of these include, but are not limited to, kaolin, gibbsite, dickite, and nacrite for the kaolinite group, which may be preferred in some embodiments.

In one preferred embodiment, the major portion (1) of the filler component consists essentially of fused silica, and the minor portion (2) of the filler component comprises kaolin, in a concentration of 0.25-5 weight percent.

The investment casting slurry which may be made from the filler component of this invention typically uses a relatively small, conventional amount of a binder component of generally conventional nature, comprising binder materials in water. For example, the binder materials may comprise colloidal silica and an organic polymer, for example an organic latex emulsion polymer of the type used for investment casting slurries. Alternatively, a water soluble polymer like polyvinyl alcohol may be used.

The finely divided materials of the filler component typically have a melting point of at least 1000°-1200° F., to be able to effectively stand firing of the molds that are formed as the wax or plastic pattern residues are eliminated.

The particle sizes of the finely divided materials of the filler component minor portion (2) are typically no larger than 500-1,000 microns (about 35-18 mesh). From a practical standpoint, finer materials have a stronger influence on the properties of the slurry then the coarser materials, so less weights of the additives will probably be used when the materials are finer. For example, in many applications the minor portion additives to the filler component may have an average particle size smaller than about 200 microns (70 mesh). Some clays can have a particle size down to below one micron. One useable form of kaolin has an average size of about 1 micron, and a surface area of about 26 square meters per gram. Generally, preferred kaolin powders may have a particle size ranging from ½ to 100 microns. Mica in the 20 to 100 micron range is also effective. Needle like particles such as Acti Gel™ are effective, and have an average length of about 0.2-1 micron and a width of 0.01-0.03 micron. Mullite and kyanite are available in the 50-150 micron range, and have also exhibited desired effects of this invention.

Other materials may also be present in the filler component as additives or extenders, if desired.

Accordingly, by this invention, investment casting slurries are provided which perform in a manner similar to the current, commercial slurries which have fibers, but those of this invention may be fiber free, while providing improvements in building shell molds which are of uniform thickness, which build their bulk rapidly with fewer coats, which provide excellent coverage in the holes, corners, and details of the investment casting, and which have a reduced drainage time, compared with a present, commercial, fiber containing, investment casting slurry.

The examples below, and the disclosure above, are offered for illustrative purposes only, and are not intended to limit the scope of the invention of this application, which is as defined in the claims below.

Example 1

A filler component for an investment casting slurry was made from a homogeneous mixture of 1% finely divided kaolin clay (particle size of about 1 micron) and 99% of various grades of finely divided silica as follows: −200 mesh-fused silica: 28.75%; −120 mesh-fused silica 15%; −100 mesh fused silica: 45%; 50×100 mesh fused silica: 1%; 30×50 mesh fused silica: 9%; fume silica: 0.25%.

The above filler component was mixed in the amount of 67.3 weight percent with 0.16 weight percent of Nalco 2305 antifoam agent; 0.05 weight percent of Nalco 8815 wetting agent, and 32.49 weight percent of a binder material comprising: (a) 76 weight percent of Nalco 1130 colloidal silica (8 nm particle size, 30% solids); (b) 8 weight percent of Nalco GMP 01 SBR latex polymer (50% solids); and (c) 16 weight percent of dionized water. This mixture was stirred to remove trapped air, and to provide an intimate mixture which comprised a slurry having a viscosity of about 19 seconds as measured with a Gardco/ISO Mini Dip Viscosity Cup with a 6 mm orifice.

The slurry was applied in conventional manner to an investment casting pattern to form a shell mold. The shell mold was then conventionally dried, and heated to melt the investment casting pattern away. It was then fired to cure the shell mold, and to eliminate any residue of meltable substrate from the shell mold. Before cooling, the shell was filled with molten metal, and allowed to cool. Upon breakaway of the shell, the resulting molded component was of excellent quality.

The slurry of this example was seen to perform at a level which was comparable with commercially used slurries, while providing improved, rapid shell buildup, with thicker coats, excellent edge retention, uniform shell thickness, and reduced drainage time after application of the slurry to an investment casting pattern.

Example 2

Substantially equivalent results were achieved when the filler component of Example 1 was replaced with a similar filler component comprising 1 weight percent finely divided (about 1 micron) kaolin clay, the balance comprising silica of the following types: 38.75 weight percent of −200 mesh fused silica; 25 weight percent of −120 mesh fused silica; 25 weight percent of −100 mesh fused silica; 1 weight percent of 50×100 mesh fused silica; 9 weight percent of 30×50 mesh fused silica; and 0.25 weight percent of silica fume.

Example 3

Generally equivalent results are obtained when the filler component of Example 1 is replaced in the investment casting slurry with an equivalent amount of finely divided filler component comprising 1 weight percent of finely divided mica and 99 weight percent of finely divided fused silica.

The invention claimed is:

1. A method of making an investment casting slurry comprising: mixing a filler component and a binder, wherein a major portion of more than 50 weight % of the filler component comprises finely divided particles selected from the group consisting of silica, aluminum, silicate, alumina and zircon; and a minor portion of less than 50 weight % of the filler component comprises finely divided kaolin particles having a plate shaped, needle shaped or tubularshaped structure, in a concentration sufficient to reduce drainage time of a slurry containing said filler component after application to an investment casting pattern, when compared with a slurry without said minor portion wherein:

the filler component and the binder component lack organic fibers;
a major filler component which defines between 0.99 and 85 weight percent of the filler component has, on average, a generally similar extent in their three dimensions;
a minor filler component which defines between 0.1 to 15 weight percent of the filler component particles has, on average, at least one dimension of the particle which is at least about four times greater than at least one other dimension of the particle;
the filler component when formed into a slurry has a viscosity of 8 to 30 seconds using a Gardco/ISO Mini Dip Viscosity Cup with a 6 mm orifice.

2. The method of claim 1, wherein the major portion consists essentially of silica.

3. The method of claim 1, wherein the minor portion consists essentially of kaolin.

4. The method of claim 3, wherein from 0.25 to 5 weight percent of kaolin is present.

5. The method of claim 1, wherein the major portion consists essentially of aluminum silicate.

6. The method of claim 1, wherein the silica particles consists essentially of a blend of fused silica and aluminum silicate.

7. The method of claim 1, wherein the silica particles consists essentially of fused silica.

8. The method of claim 1, wherein the binder materials comprise colloidal silica and an organic polymer.

9. The method of claim 1, wherein there is 55 to 85 weight percent of said filler component.

10. The method of claim 1, wherein the minor portion of finely divided materials has a melting point of at least about 1000° F.

* * * * *